May 30, 1933. F. W. CROUCH 1,911,883
MANUFACTURE OF BUTT WELD PIPE
Filed May 20, 1932
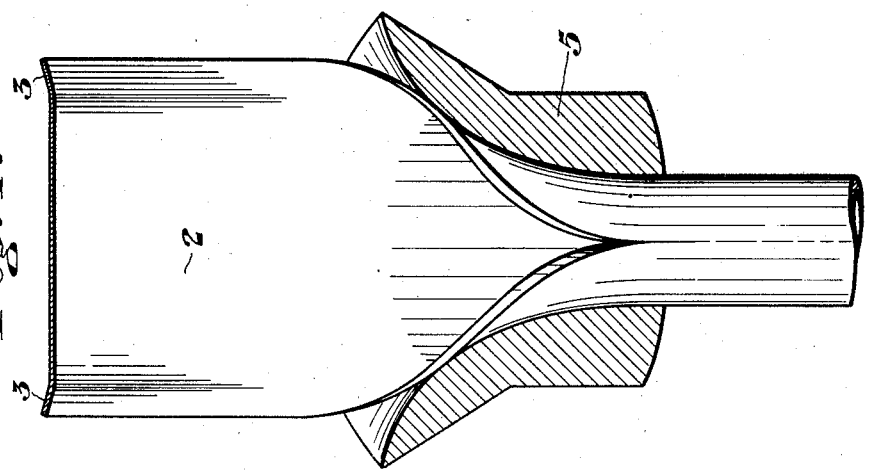
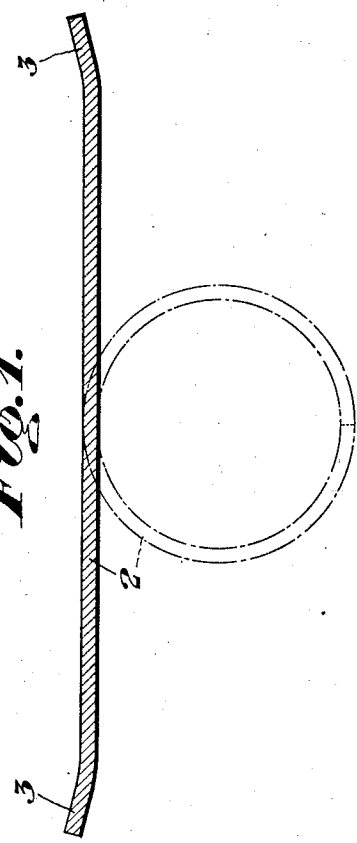
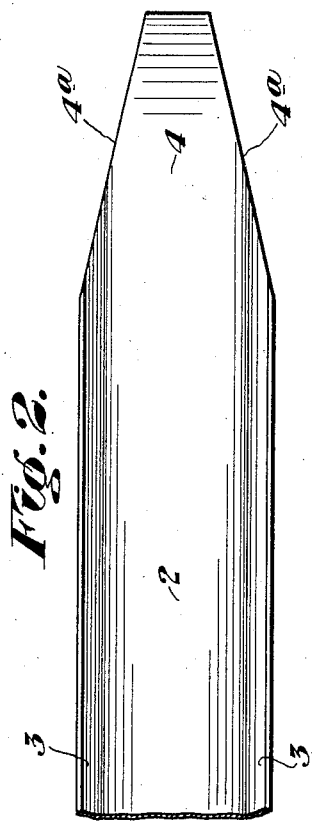
Inventor:
FLOYD W. CROUCH,
by
his Attorneys.

Patented May 30, 1933

1,911,883

UNITED STATES PATENT OFFICE

FLOYD W. CROUCH, OF McKEESPORT, PENNSYLVANIA, ASSIGNOR TO NATIONAL TUBE COMPANY, A CORPORATION OF NEW JERSEY

MANUFACTURE OF BUTT WELD PIPE

Application filed May 20, 1932. Serial No. 612,570.

This invention relates to a method of manufacturing butt weld tubes or pipes, and has for its object a method of manufacture whereby an improved weld is obtained, due to a novel working of the tube or skelp prior to and during the welding operation.

Heretofore pipe skelp have had their longitudinal edges bent or curved at an angle to the plane of the skelp prior to the heating thereof for welding, and the bent skelp have been positioned in the heating furnace with their bent edges projecting upwardly above the furnace floor so as to heat said edges to a greater degree than the main body of the skelp, and the skelp have then been drawn through the usual welding dies or bells so that the skelp is bent or curved in the same direction that the longitudinal edges have been pivotally bent to complete the formation and welding of the tube.

In the prior operations no means were provided for removing scale or oxid formed on the edges of the skelp during the heating operation and, therefore, poor welds were often formed. The present invention provides a method whereby the edges of the skelp are thoroughly cleaned prior to being brought together in welding contact and, therefore, a more perfect weld is obtained than was possible with the prior art methods.

In the drawing:

Figure 1 is a cross-section through a length of skelp having its longitudinal edges bent in readiness for the heating operation.

Figure 2 is a plan view of a piece of skelp like that shown in Figure 1.

Figure 3 is an edge view thereof.

Figure 4 is a bottom plan of the welding bell showing the skelp passing therethrough.

Referring more particularly to the drawing, the numeral 2 designates the skelp as a whole, which has a portion 3 along each longitudinal edge bent upwardly at an angle to the plane of the skelp. The skelp 2 is adapted to be positioned within the heating furnace with its bent portions 3 projecting upwardly from the bottom of the furnace so that said bent portions, and particularly the longitudinal edges, will be heated to a higher degree than the main body portion of the skelp to face the welding operation. Due to the fact that the body portion of the skelp is of a lower temperature than the edges, the body portion will be stiffer than is possible when the whole skelp must be raised to a welding temperature. Therefore, when the skelp is being drawn through the forming and welding die a greater pressure will be exerted on the contacting edges and a more perfect weld will be obtained.

The numeral 5 designates a welding die of standard construction which is adapted to form the weld on the lower side of the pipe as it passes through the die. The drawing shows the skelp passing through the die in an inverted position for the purpose of clearness.

In carrying out the method of this invention the skelp is first formed by bending its longitudinal edge portions 3 upwardly on an angle to the plane of the skelp and one end of the skelp is cut to form a V-shaped tang or leader portion 4 which is adapted to be engaged by the drawing tongs for drawing the skelp through the welding die in the usual manner. The edges of the leader portion are beveled as at $4^a$ so as to insure the bending or forming of the skelp in the proper direction in the welding die. The tang or leader portion 4 is bent downwardly at a slight angle in order to insure the skelp bending in the proper direction when being drawn through the die 5.

After the skelp is formed as above described it is charged into the usual heating furnace with its bent edge portions projecting upwardly from the bottom of the furnace, and the skelp is heated until its longitudinal edges are raised to a welding temperature. After the skelp has been raised to welding temperature the tang or leader is engaged by the tongs in the usual manner and drawn through the welding die 5 which, due to the angular disposition of the tang or leader 4, forces the skelp to bend downwardly around the die in a reverse direction to the bend of the longitudinal edge portions 3. The reverse bending of the skelp during the welding operation causes the longitudinal edges of the skelp to scrape or rub over the die and thereby break or scrape off any scale or oxid which has been formed on said edges so as to provide relatively clean longitudinal edges for welding.

During the passage of the skelp through the die 5 there is a tendency for the skelp to raise in a vertical position due to the resistance of the skelp in making a reverse bend, and this tendency causes the skelp to vibrate to some extent. Also, slight variations in the curve of the skelp from one side to the other cause one edge to be in a slightly different relative position from the other so that the edges do not go squarely together until at the point of weld. This vibration and the movement of the skelp edges relative to each other in assuming the welding position causes the edges to move slightly on each other so as to set up a rubbing action, which action serves as an aid in removing light films of oxid from the edges immediately prior to welding.

While I have shown and described specific steps of my method it will be understood that I do not wish to be limited thereto, since modifications may be made without departing from the scope of my invention, as defined in the appended claims.

I claim:

1. A method of manufacturing butt weld pipe which consists in bending the longitudinal edges of the skelp at an angle to the plane of the skelp, passing said skelp through a heating furnace with said edges projecting upwardly from the furnace bottom, and drawing the heated skelp through a welding die so as to bend the skelp in a direction opposite to the bend of the longitudinal edges.

2. A method of manufacturing butt weld pipe which consists in bending the longitudinal edges of said skelp at an angle to the plane of the skelp prior to heating said skelp for welding and then drawing the heated skelp through a welding die so as to bend the skelp during the welding operation in a direction opposite to the bend of the longitudinal edges.

In testimony whereof, I have hereunto set my hand.

FLOYD W. CROUCH.